A. W. ADT.
TOBACCO CUTTING MACHINE.
APPLICATION FILED DEC. 6, 1920.

1,419,094.

Patented June 6, 1922.
7 SHEETS—SHEET 1.

Fig. 1.

Albert W. Adt, Inventor
By Henry G. Brewington,
Attorney

A. W. ADT.
TOBACCO CUTTING MACHINE.
APPLICATION FILED DEC. 6, 1920.

1,419,094.

Patented June 6, 1922.

UNITED STATES PATENT OFFICE.

ALBERT W. ADT, OF BALTIMORE, MARYLAND, ASSIGNOR TO JOHN B. ADT COMPANY, OF BALTIMORE, MARYLAND, A CORPORATION OF MARYLAND.

TOBACCO-CUTTING MACHINE.

1,419,094.  Specification of Letters Patent.  Patented June 6, 1922.

Application filed December 6, 1920. Serial No. 428,706.

*To all whom it may concern:*

Be it known that I, ALBERT W. ADT, a citizen of the United States, residing at Baltimore city, State of Maryland, have invented certain new and useful Improvements in Tobacco-Cutting Machines, of which the following is a specification.

This invention relates to machines for cutting tobacco into fine strips for use as a filler for cigarettes, and the invention has for its object to provide a novel and improved machine which will cut strips of uniform width in accordance with the demands of the trade.

With the object stated in view, the invention consists in a novel combination and arrangement of adjustable feeding and cutting means, and other parts to be described in detail hereinafter, and in order that the same may be better understood, reference is had to the accompanying drawings forming a part of this specification.

Referring specifically to the drawings, 10 denotes a frame base or bed which is provided with suitable means for supporting the various constituent elements of the machine. The frame of the machine includes laterally spaced side members 11 forming the side walls of a trough which receives the tobacco to be cut, said walls being flared at the top, as shown at 12. The bottom of the trough is an endless conveyer belt 13 trained over rollers 14 and 15, respectively. The roller 14 is carried by a shaft 16 and the roller 15 by a shaft 17, the latter shaft being carried by an adjustable bearing to permit proper tensioning of the belt 13.

Figure 1:
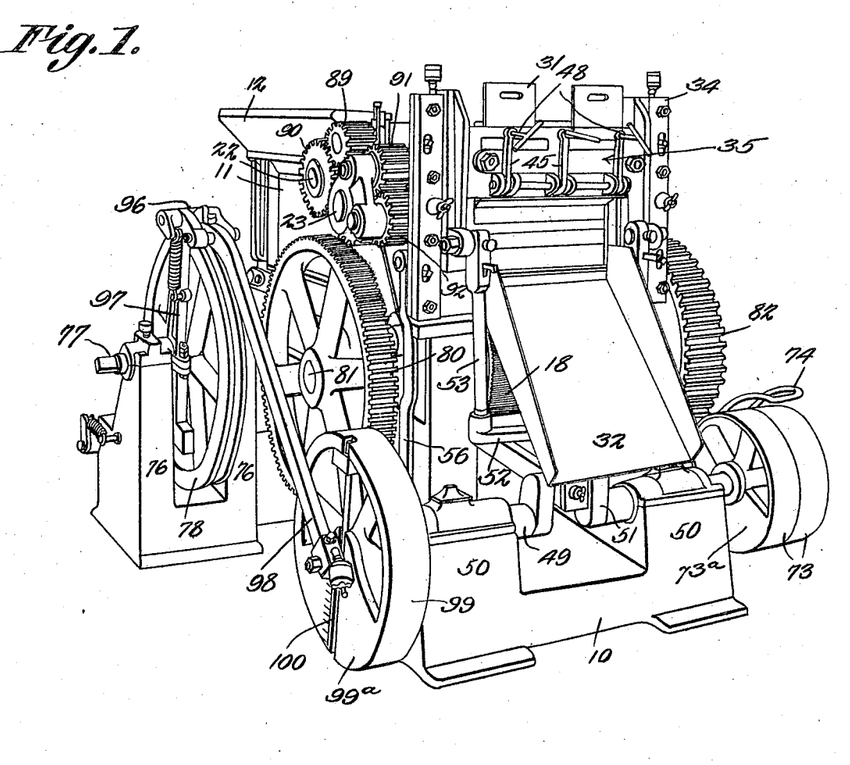
Figure 1 is a perspective view of the machine.
Figure 2:
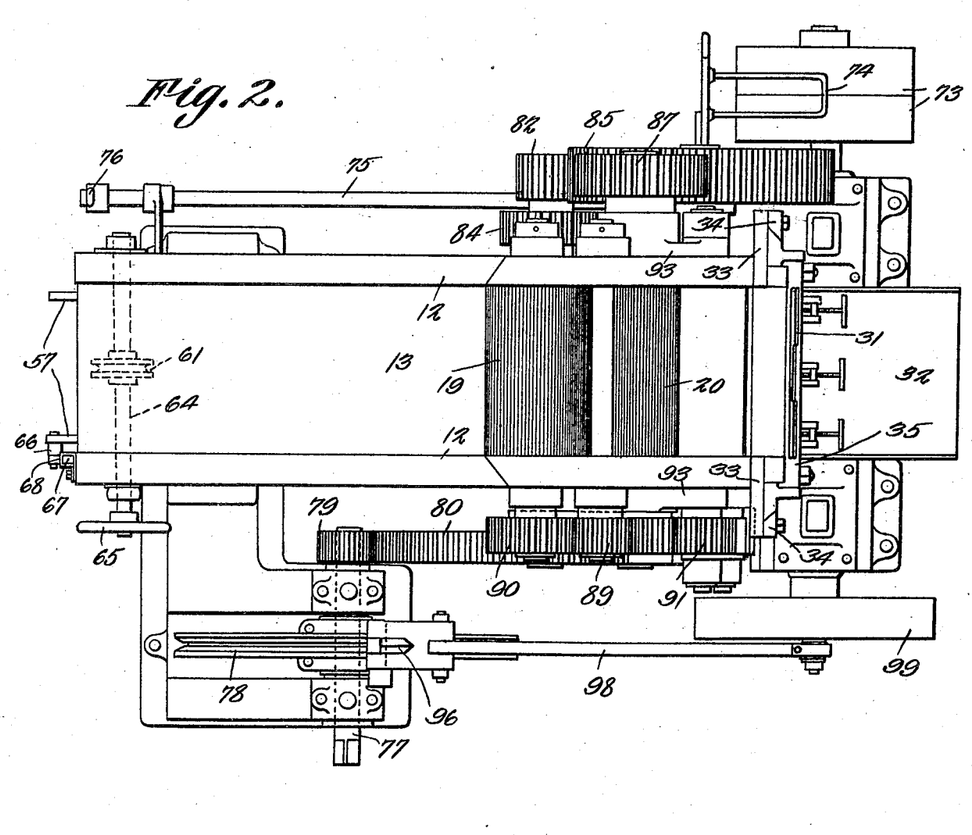
Fig. 2 is a plan view thereof.
Figure 3:
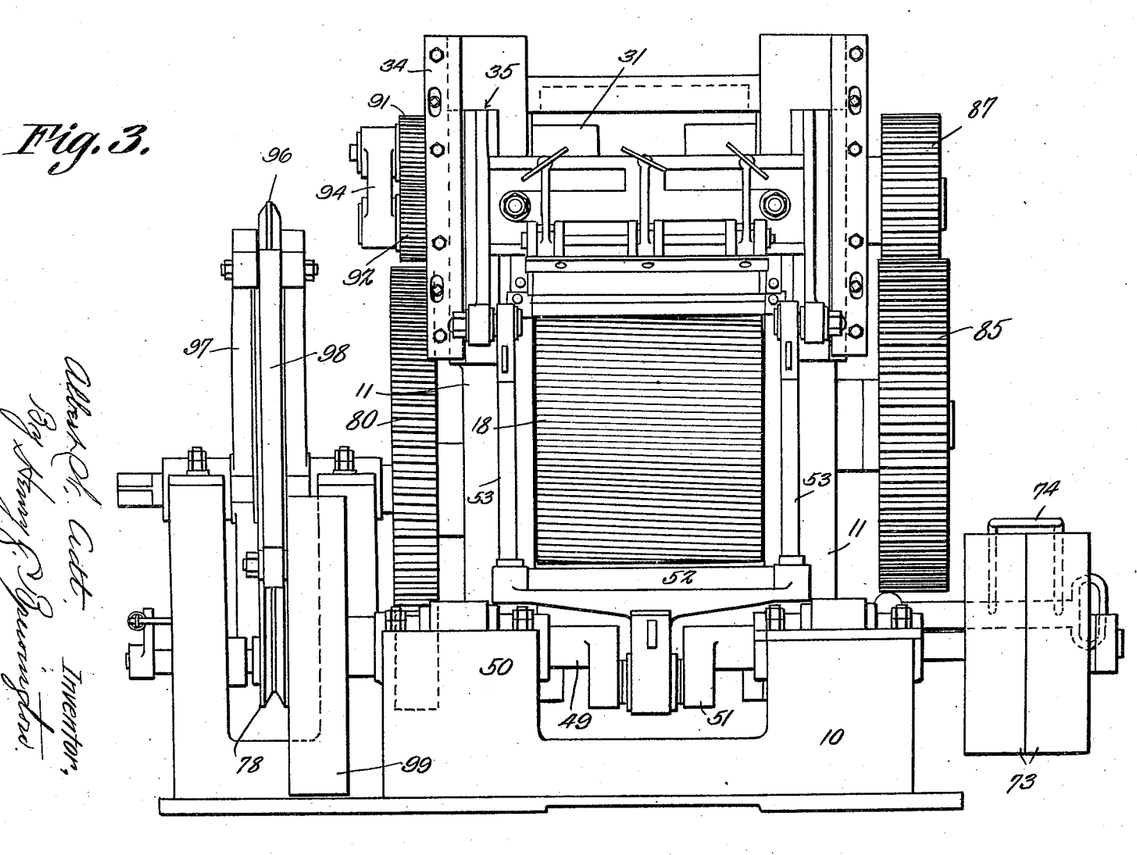
Fig. 3 is an elevation of the cutting and discharge end of the machine.
Figure 4:
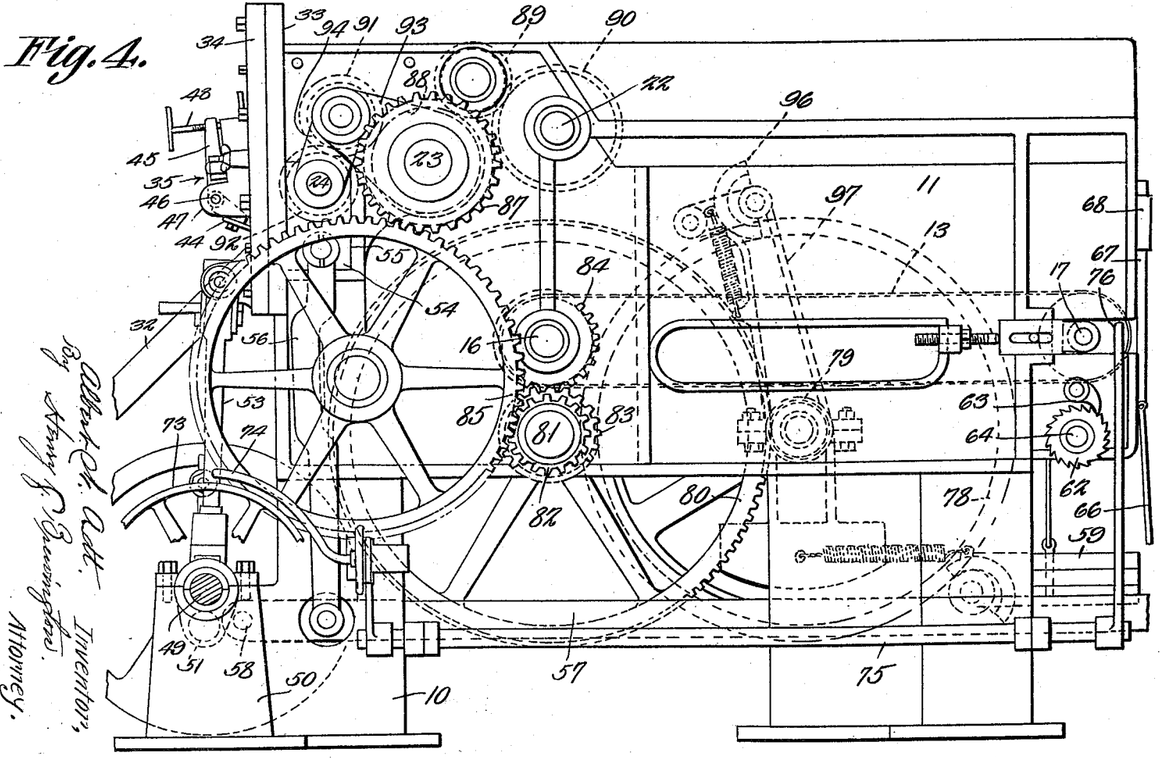
Fig. 4 is a side elevation.

Close to the discharge end of the belt 13 is a large feed drum 18 having its surface corrugated lengthwise as shown in Figs. 2 and 3. The width of the belt and the length of drum are such that said parts may seat between the trough side walls 11. The belt runs in the direction of the length of the trough and toward the drum, and the latter extends transversely of the trough and is rotated in a direction to advance the tobacco toward the cutter.

Above the drum 18 and the discharge end of the belt 13, parallel to the former, are located three feed and presser rollers 19, 20 and 21 carried by shafts 22, 23 and 24, respectively.

Figure 5:
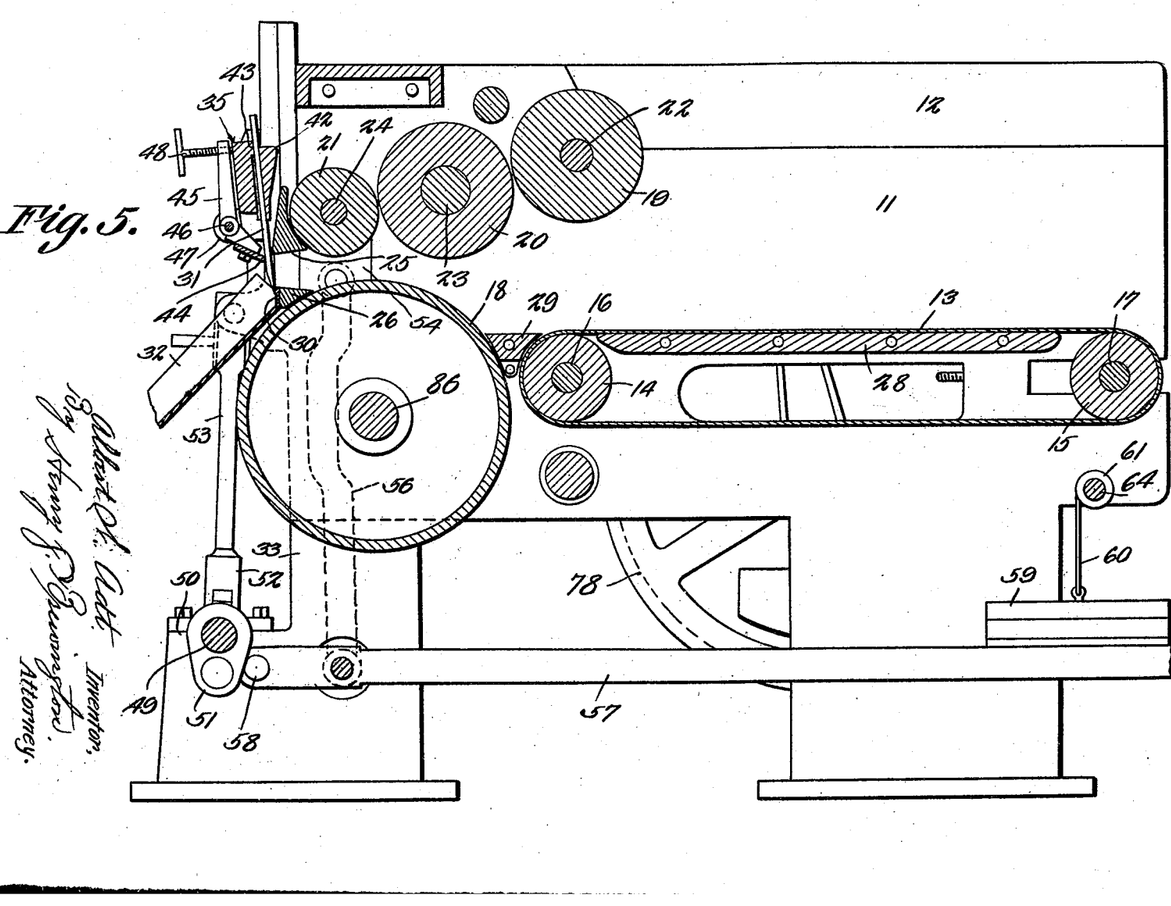
Fig. 5 is a central longitudinal section.
Figure 6:
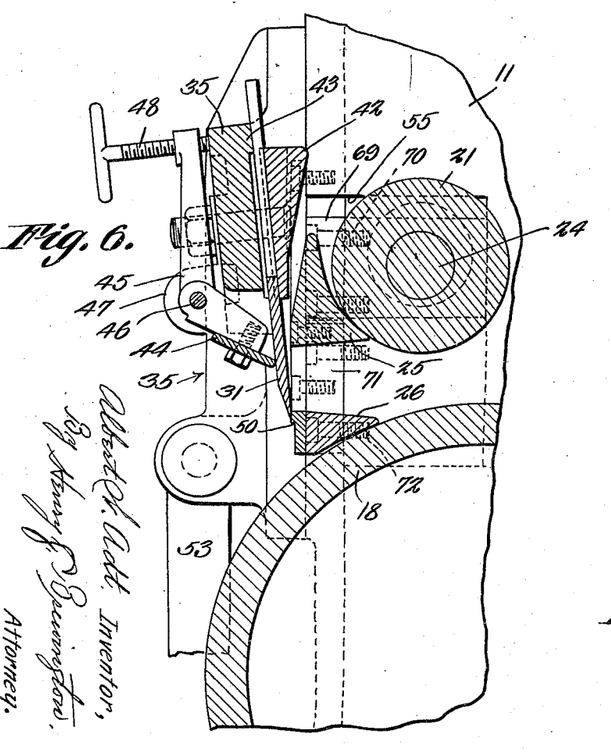
Fig. 6 is an enlarged cross-section of the cutting mechanism.
Figure 7:
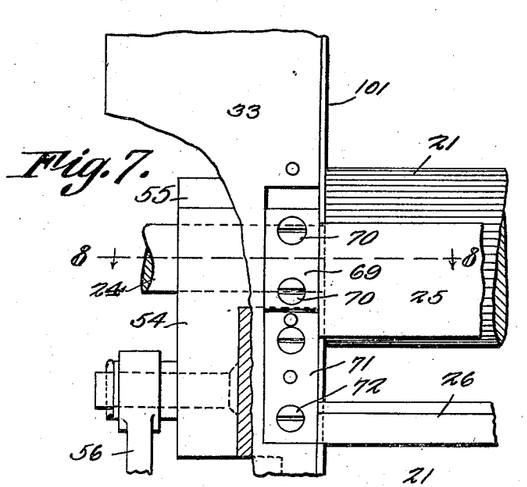
Fig. 7 is an elevation showing in detail the supporting means of a feed and presser roller.
Figure 8:
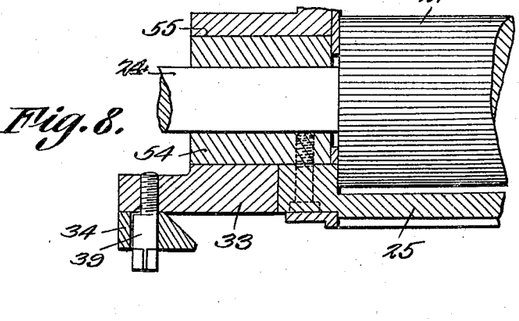
Fig. 8 is a horizontal section on the line 8—8 of Fig. 7.
Figure 9:
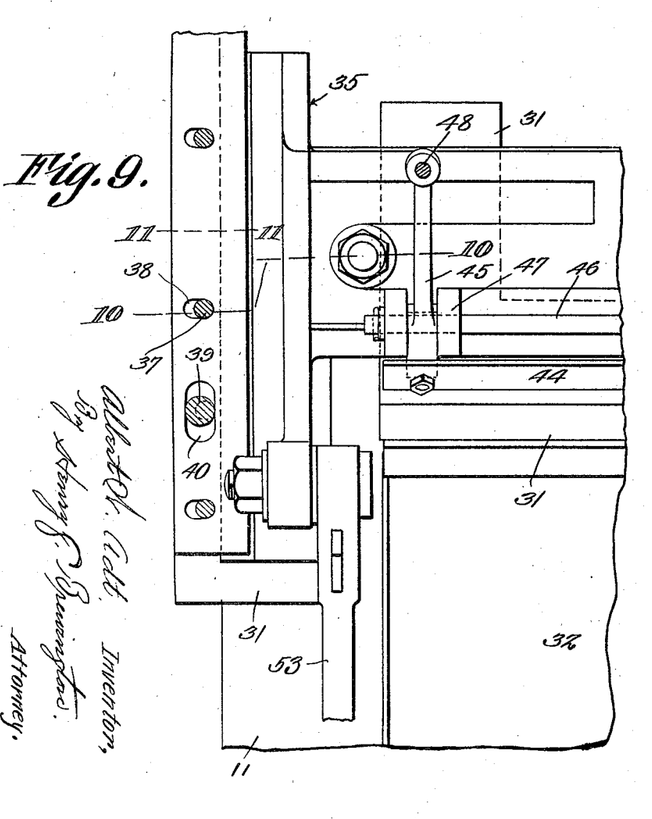
Fig. 9 is a front elevation, partly in section, showing a support for the cutting mechanism.
Figure 10:
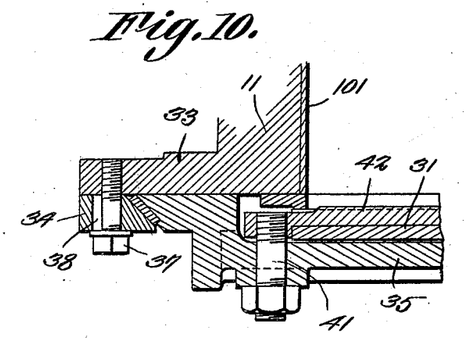
Fig. 10 is a horizontal section on the line 10—10 of Fig. 9.
Figure 11:
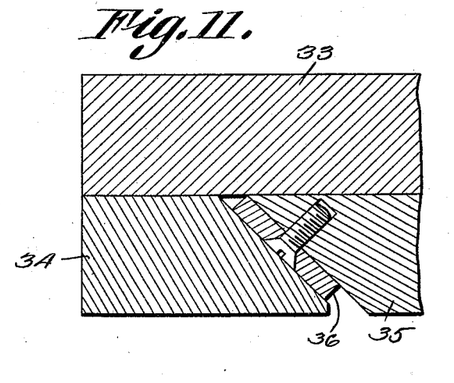
Fig. 11 is a horizontal section on the line 11—11 of Fig. 9.

In front of the roller 21 is located a cross member 25, and beneath the latter and extending parallel thereto in spaced relation therewith, is a second cross member 26. These two cross members are set to form mouth pieces and define a contracted throat through which the tobacco is fed to the cutter. The mouth piece 25 is parallel to the roller 21 which is the last one of the series of three feed and presser rollers, and it is set close to said roller in front and extends downwardly as far as the bottom thereof. The mouth piece 26 is set close to the periphery of the drum 18 back of the vertical center line thereof where the movement of the drum surface starts downwardly. It will also be noted in Fig. 5 that the rollers 19, 20 and 21 are set so that the space between the same and the belt 13 and drum 18 gradually contracts in the direction of the throat formed by the mouth pieces 25 and 26, and hence the mass of tobacco as it is fed forwardly is compacted and issues from the mouth in a relatively thin layer or sheet across which the cuts are made to reduce the tobacco into fine strips suitable for a cigarette filler.

Below the upper run of the conveyer belt 13 is located a platform 28 for catching any tobacco which may work off the belt, and between the drum 18 and the discharge end of the belt is a bridge piece 29 to close the gap therebetween.

On the rear edge of the cross member 26 is mounted a ledger plate 30 across which operates the cutter, the same consisting of a vertically reciprocating, elongated blade 31 sharpened at its bottom edge, and of such length as to correspond to the length of the mouth or tobacco discharge opening formed by the members 25 and 26. From the member 26 also extends a chute 32 onto which the cut fragments of tobacco drop for proper disposal.

At the rear end of the machine, the frame thereof has laterally spaced uprights 33 on which are mounted vertical bars 34 forming slideways for a vertically reciprocatory crosshead 35 carrying the cutting blade 31. The inner edges of the bars 34 are undercut to retain the cross-head 35, and said bars are adjustable to compensate for wear at the ends of the cross-head, said ends being fitted with hardened steel wear strips 36. In order that the bars 34 may be moved inwardly for the purpose stated, the bolts 37 securing the same to the uprights 33 pass through transverse slots 38 in the bars. The shifting of the bars 34 is effected by cam studs 39 carried by the uprights 33 and seating in vertical slots 40 in the bars.

To the back of the cross-head 35 is bolted or otherwise secured, as shown at 41, a blade clamping plate 42, said plate engaging one side of the blade 31 and holding it clamped near its upper edge against a longitudinal rib 43 on the back of the cross-head. The blade 31 depends from the crosshead 35, and near its lower or cutting edge it is engaged in front by a clamping bar 44 supported in such a manner that it may be operated to flex the blade toward the ledger plate 30 and thus locate it in proper operative relation therewith.

For the purpose stated, the clamping bar 44 is mounted on a series of angle-levers 45 fulcrumed on a rod 46 supported in ears 47 on the cross-head 35. Hand screws 48 are threaded through the angle levers 45 to bear against the cross-head, by which said angle levers are swung to press the bar 44 against the projecting end of the blade 31. The bar 44 is somewhat flexible, and hence different portions of it, according to which hand screw 48 is operated, can be pressed against the blade to flex corresponding portions of the latter into proper operative relation with respect to the ledger plate 30. It will therefore be seen that if any portion of the blade 31 should start to operate improperly, it can be reset instantly, and this can be done without stopping the machine.

The cross-head 35 is operated from a main drive shaft 49 supported in bearings on pedestals 50 at the rear end of the frame base 10. On the shaft 49 is a crank 51 to which is connected a yoke 52 carrying pitmen 53 which are connected to the cross-head 35.

The feed and presser roller 21, as well as the top mouth piece 25 hereinbefore referred to, are yieldingly supported so that they may rise and fall under the influence of the tobacco passing beneath the same. The shaft 24 of roller 21 is supported in vertically movable bearings 54 seating in recesses 55 in the uprights 33. From the bearings 54 extend links 56 which are connected at their lower ends to a weighted beam 57, said beam being pivoted at one end to the frame of the machine, as shown at 58, and carrying at its other end a number of weights 59. The last mentioned end of the beam 57 is also connected by a cable 60 to a drum 61 supported by the frame of the machine, and having at one end a ratchet wheel 62 engageable by a pawl 63. The downward movement of the weighted end of the lever 57 lowers the roller 21, and through the cable, the drum, and the pawl-and-ratchet device, the extent of the downward movement of the roller can be limited, and the roller thus positioned the desired distance above the drum 18, it being normally so held by the pawl-and-ratchet device. The roller 21 is however free to rise under the influence of the tobacco passing under the same, this movement being resisted by the weighted lever 57, which latter restores the roller to its normal position. One end of the drum shaft 64 has a hand wheel 65 for operating the drum to regulate the height of the roller 21 above the feed drum 18.

To facilitate the proper setting of the roller 21, the weighted end of lever 57 is connected by a link 66 to a graduated slide bar 67 operating under a strap 68 which serves as an index for the scale on the slide bar.

The mouth piece 25 moves with the roller 21, its ends having vertical flanges 69 which are bolted or otherwise fastened, as shown at 70, to the vertically movable bearings 54 of the roller shaft 24.

The bottom mouth piece 26 is stationary and has vertical end flanges 71 which are bolted or otherwise fastened to the uprights 33, as shown at 72.

The following means are provided for driving the conveyer 13, and the drum 18: The main drive shaft 49 is belted or otherwise connected to a suitable power source. The drawings show fast and loose pulleys 73, with a belt shifter loop 74 operatively connected to a rock-shaft 75 provided with a lever arm 76 for actuation.

At the forward end of the frame, on one side thereof are bearing pedestals 76' supporting a shaft 77 on which are made fast a friction wheel 78 and a pinion 79, the latter being in mesh with a spur gear 80 on a shaft 81 extending transversely of the machine. The spur gear 80 is on one end of the shaft 81, on the outside of the frame of the machine, and on the opposite end of the shaft, alongside the corresponding side of the frame, said shaft is equipped with pinions 82 and 83. The pinion 83 is in mesh with a pinion 84, and the pinion 82 is in mesh with a spur gear 85. Pinion 84 is on the conveyer drive shaft 16, and gear 85 is on a transverse shaft 86 carrying the drum 18 which is positioned close to the discharge end of the belt 13. The shafts 81, 16 and 86 are suitably supported by the laterally spaced side frame members 11, and they extend therebetween.

The conveyer belt 13 is trained over the rollers 14 and 15, the former being on the shaft 16 and the latter on the shaft 17 supported by the frame members 11. The belt 13 is driven by the roller 14, the latter obtaining motion from its shaft 16.

The drum 18 is driven by the shaft 86, and its surface is corrugated, as clearly shown in Figs. 2 and 3, the corrugations running lengthwise. The rollers 19, 20 and 21 may also be corrugated.

The rollers 19, 20 and 21 are driven from the spur gear 85 through the following means:

On one end of the shaft 23 of roller 20 is a pinion 87 which is in mesh with spur gear 85, whereby said roller is driven. On the other end of roller shaft 23 is a pinion 88 which is in mesh with an idler pinion 89, the latter being in mesh with a pinion 90 on roller shaft 22. The motion of shaft 23 is also transmitted to roller shaft 24 through an idler pinion 91 in mesh with the pinion 88 and also meshing with a pinion 92 on roller shaft 24. As pointed out hereinbefore, the roller 21 is free to rise and fall and hence provision must be made for preventing the drive pinions from getting out of mesh. This is done in the following manner:

The idler pinion 91 is carried by an arm 93 pivotally supported by shaft 23 and extending radially therefrom, and a link 94 connects shaft 24 and the shaft 95 of idler pinion 91. It will therefore be evident that the idler pinion 91 remains in mesh with the pinions 92 and 88 at all times.

The shaft 77 is given an intermittent rotary motion by a gripping device 96 carried by a pair of swinging arms 97 supported by shaft 77 and connected by a pitman 98 to a wrist wheel 99 on shaft 49. This mechanism forms no part of the invention and hence a detailed description is not necessary. The wrist wheel 99 has a radial slot 100 for an adjustable connection of the pitman 98 therewith to vary the length of the strokes of the arms 97. The intermittent rotary motion of the shaft 77 is transmitted to the feed and cutting mechanism through the gearing hereinbefore described. It will therefore be seen that the tobacco is fed forwardly at intervals to protrude from the mouth formed by the cross members 25 and 26, and upon descent of the blade 31 the protruding strip is severed. The gearing is so arranged that the tobacco is fed during the upward or return stroke of the blade 31. The cross member 25 and the roller 21 give the tobacco the desired pressure to enable the blade 31 to make a clean cut.

The inner surface of the walls 11 forming the sides of the feed trough may be provided with a sheet metal lining 101.

It will be noted that the provision of two pitmen 53 permits the driving connection with the cross head 35 to be made near the ends thereof and the ends of the blade 31, whereby the pull on the cross head is equalized. The mechanism is also perfectly balanced as the main drive shaft 49 is positioned below the cross head 35, and the pulleys 73 and the wrist wheel 99 are provided with counterbalances, as shown at 73$^a$ and 99$^a$, respectively. The pulleys 73 are on one end of the shaft 49, and the wrist wheel 99 is on the opposite end of said shaft, whereas the crank 51 is midway between the shaft ends. The perfect balance thus obtained enables the machine to be run at a high rate of speed with little or no vibration.

I claim:

1. In a tobacco-cutting machine, the combination of a vertically-reciprocatory crosshead, a cutting-blade, of somewhat flexible metal, rigidly carried by said cross-head and having a portion thereof projecting beneath said cross-head, a ledger plate across which said projecting portion of the cutting-blade operates, and means carried by said crosshead for flexing said projecting portion of the cutting-blade to effect adjustment thereof relative to said ledger plate.

2. In a tobacco-cutting machine, the combination of a vertically-reciprocatory crosshead, a cutting-blade, of somewhat flexible metal, rigidly carried by said cross-head and having a portion thereof projecting beneath said cross-head, a ledger-plate across which said projecting portion of the cutting-blade operates, a flexible member engageable with said projecting portion of the cutting-blade to flex the same to effect adjustment thereof relative to said ledger-plate, a shaft carried by said cross-head, and a series of individually operable levers fulcrumed on said shaft and secured to said flexible member for actuating the same.

3. In a tobacco-cutting machine, the combination of a vertically-reciprocatory crosshead, a cutting-blade, of somewhat flexible metal, rigidly carried by said cross-head and having a portion thereof projecting beneath said cross-head, a ledger-plate across which said projecting portion of the cutting-blade operates, a flexible member engageable with said projecting portion of the cutting-blade to flex the same to effect adjustment thereof relative to said ledger-plate, a shaft carried by said cross-head, a series of individually-operable levers fulcrumed on said shaft and secured to said flexible member for actuating the same, and screws passing through the upper portions of said levers and bearing against said cross-head for actuating said levers.

4. In a tobacco-cutting machine, the combination of a vertically-reciprocatory cross-head, a cutting-blade, of somewhat flexible metal, rigidly carried by said cross-head and having a portion thereof projecting beneath said cross-head, a ledger-plate across which said projecting portion of the cutting-blade operates, a flexible member engageable with said projecting portion of the cutting-blade to flex the same to effect adjustment thereof relative to said ledger-plate, and means carried by said cross-head for selectively flexing different portions of said flexible member.

5. In a tobacco-cutting machine, the combination of a feed-drum, a feed-and-presser roller thereabove, a shaft carrying said roller, vertically-reciprocatory bearings supporting the ends of said shaft, and means for returning said bearings to normal position after upward movement thereof, comprising a weighted lever, and links between said lever and said bearings.

6. In a tobacco-cutting machine, the combination of a feed-drum, a feed-and-presser roller thereabove; a shaft carrying said roller; vertically-reciprocatory bearings supporting the ends of said shaft; means for returning said bearings to normal position after upward movement thereof, comprising a weighted lever, and links between said lever and said bearings; and means for adjustably limiting the swing of the lever in one direction.

7. In a tobacco-cutting machine, the combination of a feed-drum; a feed-and-presser roller thereabove; a shaft carrying said roller; vertically-reciprocatory bearings supporting the ends of said shaft; means for returning said bearings to normal position after upward movement thereof, comprising a weighted lever, and links between said lever and said bearings; means for adjustably limiting the swing of the lever in one direction; and indicating means associated with said last-mentioned means.

In testimony whereof I affix my signature.

ALBERT W. ADT.